United States Patent
Jia et al.

(10) Patent No.: US 10,365,955 B2
(45) Date of Patent: Jul. 30, 2019

(54) RESOURCE ALLOCATION IN CLOUD ENVIRONMENT

(71) Applicant: International Business Machines Corporation, Armonk, NY (US)

(72) Inventors: Ji Jia, Beijing (CN); Xiao Chuan Li, Beijing (CN); Jiang Lu, Beijing (CN); Qing Hai Meng, ShangDi (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 14/488,475

(22) Filed: Sep. 17, 2014

(65) Prior Publication Data
US 2015/0143367 A1 May 21, 2015

(30) Foreign Application Priority Data
Nov. 28, 2013 (CN) .......................... 2013 1 0625416

(51) Int. Cl.
*G06F 9/48* (2006.01)
*G06F 9/50* (2006.01)
(Continued)

(52) U.S. Cl.
CPC ........ *G06F 9/5088* (2013.01); *G06F 9/45558* (2013.01); *G06F 9/4856* (2013.01);
(Continued)

(58) Field of Classification Search
CPC ... G06F 2009/45562; G06F 2009/4557; G06F 2009/45575; G06F 9/4856; G06F 9/50–9/5088
(Continued)

(56) References Cited

U.S. PATENT DOCUMENTS 5,175,679 A * 12/1992 Allen ..................... G03G 15/50
700/28
8,359,223 B2 1/2013 Chi et al.
(Continued)

FOREIGN PATENT DOCUMENTS

| CN | 101986274 A | 3/2011 |
| CN | 101938416 B | 8/2012 |
| CN | 102932279 A | 2/2013 |

OTHER PUBLICATIONS

Ionescu, D., VM and Workload Fingerprinting for Software Defined Datacenters, Master's Thesis, MIT, Feb. 2013, 90 pages, [retrieved on Jan. 6, 2016], Retrieved from the Internet: <URL:http://dspace.mit.edu/handle/1721.1/85425>.*

(Continued)

*Primary Examiner* — Geoffrey R St Leger
(74) *Attorney, Agent, or Firm* — Garg Law Firm, PLLC; Rakesh Garg; Michael O'Keefe

(57) ABSTRACT

A method for resource allocation in a cloud environment detects a metrics parameter of at least a first virtual machine among a plurality of virtual machines inside a virtual system in the cloud environment; calculates a key performance indicator according to the metrics parameter, the key performance indicator indicating running status of at least the first virtual machine; and reallocates resources among at least the first virtual machine and other virtual machines within the virtual system based on the key performance indicator through the cloud environment in response to the key performance indicator indicating that at least the first virtual machine is overloaded.

2 Claims, 10 Drawing Sheets

(51) Int. Cl.
  G06F 9/455       (2018.01)
  H04L 12/26       (2006.01)
(52) U.S. Cl.
  CPC ............ *G06F 9/505* (2013.01); *G06F 9/5016*
           (2013.01); *G06F 9/5027* (2013.01); *H04L*
           *43/0817* (2013.01); *G06F 2009/4557*
           (2013.01); *G06F 2009/45562* (2013.01)
(58) Field of Classification Search
  USPC ..................................................... 718/1, 104
  See application file for complete search history.

(56) References Cited

U.S. PATENT DOCUMENTS

| | | | | |
|---|---|---|---|---|
| 8,429,276 | B1* | 4/2013 | Kumar | G06F 9/5077 |
| | | | | 709/226 |
| 8,627,123 | B2* | 1/2014 | Jain | G06F 1/3209 |
| | | | | 713/310 |
| 8,868,746 | B2* | 10/2014 | Zimmet | G06F 9/5061 |
| | | | | 709/226 |
| 9,052,935 | B1* | 6/2015 | Rajaa | G06F 9/45558 |
| 9,164,786 | B2* | 10/2015 | Bingham | G06F 9/45533 |
| 9,578,088 | B2* | 2/2017 | Nickolov | G06F 9/4856 |
| 2011/0138055 | A1 | 6/2011 | Daly et al. | |
| 2011/0239010 | A1* | 9/2011 | Jain | G06F 1/3209 |
| | | | | 713/310 |
| 2012/0072579 | A1 | 3/2012 | Teather | |
| 2012/0117563 | A1* | 5/2012 | Chang | G06F 9/45558 |
| | | | | 718/1 |
| 2012/0173709 | A1 | 7/2012 | Li | |
| 2012/0233315 | A1 | 9/2012 | Hoffman | |
| 2012/0246638 | A1 | 9/2012 | He et al. | |
| 2012/0331127 | A1* | 12/2012 | Wang | G06F 9/5083 |
| | | | | 709/224 |
| 2013/0014107 | A1 | 1/2013 | Kirchhofer | |
| 2013/0080619 | A1 | 3/2013 | Assuncao et al. | |
| 2013/0247043 | A1* | 9/2013 | Bingham | G06F 9/45533 |
| | | | | 718/1 |
| 2014/0007097 | A1* | 1/2014 | Chin | G06F 9/45533 |
| | | | | 718/1 |
| 2014/0040343 | A1* | 2/2014 | Nickolov | G06F 9/4856 |
| | | | | 709/201 |
| 2014/0164618 | A1* | 6/2014 | Alicherry | G06F 9/5072 |
| | | | | 709/226 |

OTHER PUBLICATIONS

Amoretti, M., et al., A Cooperative Approach for Distributed Task Execution in Autonomic Clouds, 21st Euromicro International Conference on Parallel, Distributed, and Network-Based Processing, Feb. 27-Mar. 1, 2013, pp. 274-281, [retrieved on Feb. 22, 2019], Retrieved from the Internet: <URL:http://ieeexplore.ieee.org/>.*

Minarolli, D., et al., Utility-based Resource Allocation for Virtual Machines in Cloud Computing, IEEE Symposium on Computers and Communications (ISCC), Jun. 28-Jul. , 2011, pp. 410-417, [retrieved on Feb. 22, 2019], Retrieved from the Internet: <URL:http://ieeexplore.ieee.org/>.*

Watson et al; Probabilistic Performance Modeling of Virtualized Resource Allocation, 99-108, ICAC'10, Jun. 7-11, Washington, DC, USA. 2010.

Wang et al; AppRAISE: Application-Level Performance Management in Virtualized Server Environments, 240-254, IEEE Transactions on Network and Service Management, vol. 6, No. 4, Dec. 2009.

* cited by examiner

RESOURCE ALLOCATION IN CLOUD ENVIRONMENT

BACKGROUND

Various embodiments of the present invention relate to resource management, and more specifically, to a method and apparatus for resource allocation in a cloud environment.

With the development of computer hardware and software, cloud computing can provide more powerful computing capabilities. With the support of cloud computing, consumers of the cloud computing can leverage a conventional local computing device to invoke powerful computing capabilities in a cloud environment. On one hand, cloud computing consumers do not have to purchase a dedicated high-performance computing device. On the other hand, they do not have to execute a complex setting process with respect to a high-performance computing device; instead, they just submit a simple resource request to a provider of the cloud computing before receiving dedicated services from such a provider.

For example, an online seller is a typical example of the cloud computing consumers. The online seller might wish to build an online shopping website (virtual system) and display information of items for sale, such as name, model, photo, function description and the like, on pages of the online shopping website. In the context of the present invention, a virtual system may logically comprise at least one virtual machine in a cloud computing environment, and the at least one virtual machine is for performing desired functions of cloud computing consumers.

A concrete example of a virtual system may be an online shopping website, an online hotel booking website, an online ticket booking website, etc. Note in the context of the present invention, each of these websites may be a separate virtual system. For example, an online shopping website for skin care products may be one virtual system, while an online shopping website for electronics may be another virtual system.

In a traditional cloud computing environment, an online seller can request a provider of the cloud computing environment for a specific amount of resources for storing the above information and performing other relevant functions. When resources requested by the online seller are not adequate to support current demands (for example, access to a website by a large number of users leads to overload of the website server), usually additional computing resources in the cloud computing environment should be requested, so as to alleviate the computing resource shortage in the servers of the online seller.

In an existing cloud computing environment, on one hand, the total amount of computing resources relies on the support provided by physical computing nodes in the cloud computing environment, so cloud computing consumers cannot request computing resources to the cloud computing environment without limit; on the other hand, cloud computing consumers must pay for requested computing resources. If an online seller requests computing resources according to the demand at the peak of computing resources, then resource waste will be caused when access to the shopping website is at the bottom.

Therefore, in a cloud computing environment where the total amount of computing resources are rather limited, it becomes a burning issue how to ensure applications on each virtual machine in a virtual system to run normally and adaptively schedule computing resources in case of virtual machine overload.

SUMMARY

Therefore, it is desired to develop a technical solution capable of adaptively scheduling computing resources of each virtual machine in a virtual system, and it is desired the technical solution can be compatible with existing resource allocation and resource scheduling mechanisms in cloud computing, thereby increasing resource usage in the cloud computing environment on the basis of making adequate use of existing resources in the virtual system as far as possible.

In one embodiment of the present invention, there is provided a method for resource allocation in a cloud environment, comprising: detecting a metrics parameter of at least a first virtual machine among a plurality of virtual machines inside a virtual system in the cloud environment; calculating a key performance indicator according to the metrics parameter, the key performance indicator indicating running status of at least the first virtual machine; and reallocating resources among at least the first virtual machine and other virtual machines within the virtual system based on the key performance indicator through the cloud environment in response to the key performance indicator indicating that at least the first virtual machine is overloaded.

In one embodiment of the present invention, the total amount of resources occupied by the virtual system remains the same throughout the reallocation.

In one embodiment of the present invention, the metrics parameter comprises any of: an application metrics parameter indicating a performance parameter of an application running on at least the first virtual machine among the plurality of virtual machines; and a hardware metrics parameter indicating a performance parameter of hardware in at least the first virtual machine among the plurality of virtual machines.

In one embodiment of the present invention, there is provided an apparatus for resource allocation in a cloud environment, comprising: a measuring module configured to detect a metrics parameter of at least a first virtual machine among a plurality of virtual machines inside a virtual system in the cloud environment; a calculating module configured to calculate a key performance indicator according to the metrics parameter, the key performance indicator indicating running status of at least the first virtual machine; and a reallocating module configured to reallocate resources among at least the first virtual machine and other virtual machines within the virtual system based on the key performance indicator through the cloud environment in response to the key performance indicator indicating that at least the first virtual machine is overloaded.

In one embodiment of the present invention, the total amount of resources occupied by the virtual system remains the same.

In one embodiment of the present invention, the metrics parameter comprises any of: an application metrics parameter indicating a performance parameter of an application running on at least the first virtual machine among the plurality of virtual machines; and a hardware metrics parameter indicating a performance parameter of hardware in at least the first virtual machine among the plurality of virtual machines.

By means of the method and apparatus of the present invention, first the shortage of computing resources can be solved within the virtual system; when free computing resources within the virtual system are insufficient to meet current resource overheads, additional computing resources in the cloud computing environment are requested. With the method and apparatus of the present invention, resources can be allocated adaptively among various virtual machines in the virtual system, the usage of internal computing resources of the virtual system can be enhanced, and further the usage of computing resources in the whole cloud computing environment can be increased.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
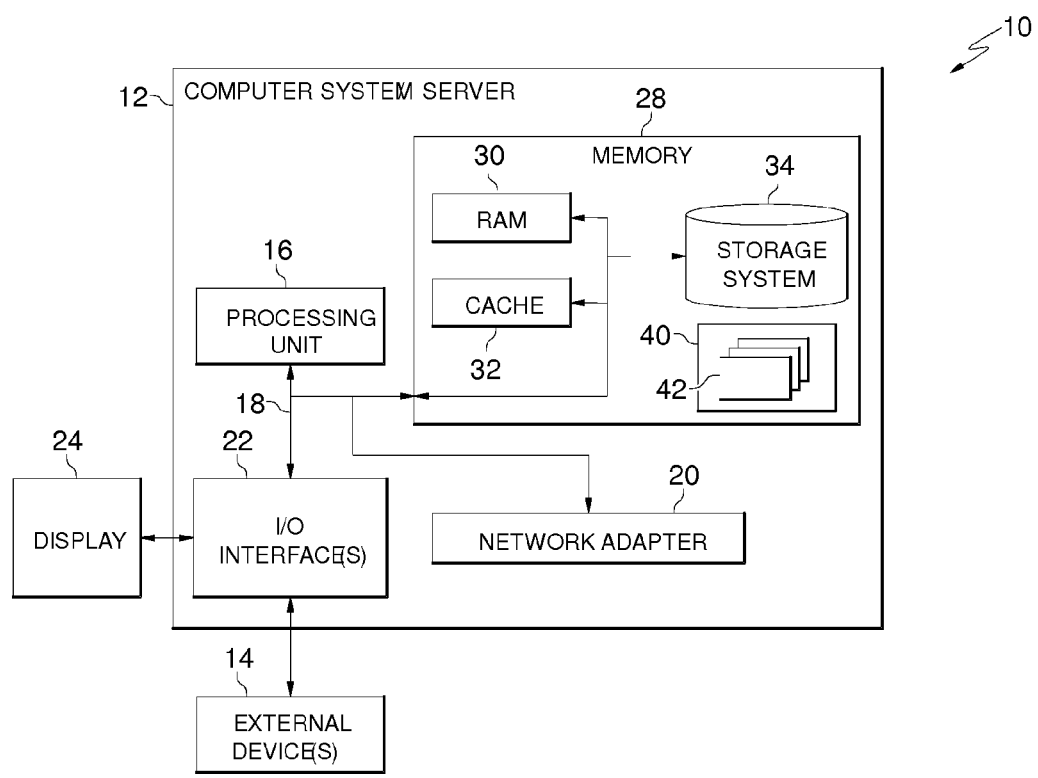
FIG. 1 schematically illustrates a block diagram of an exemplary computer system/server which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
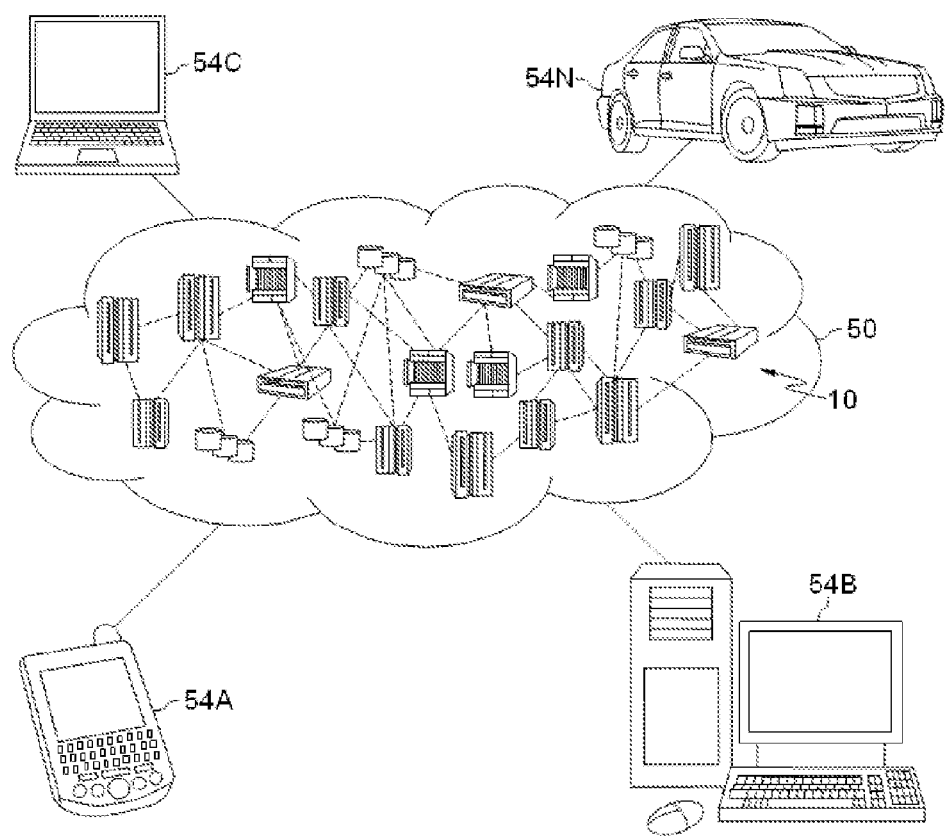
FIG. 2 schematically illustrates an exemplary cloud computing environment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
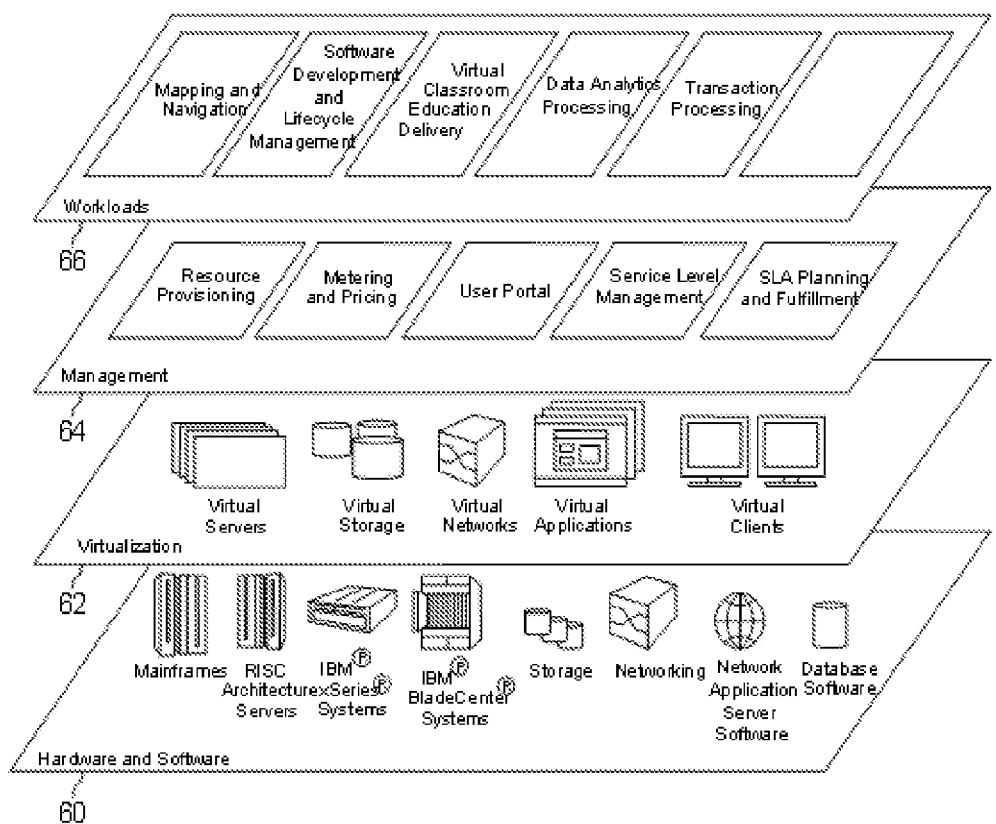
FIG. 3 schematically illustrates abstraction model layers provided by a cloud computing environment 50 (FIG. 2)

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing.

In one embodiment of the present invention, a resource allocation solution according to the various embodiments of the present invention may be implemented at virtualization layer 62, so as to adaptively allocate resources among multiple virtual machines within the virtual system in the cloud computing environment.

Figure 4:
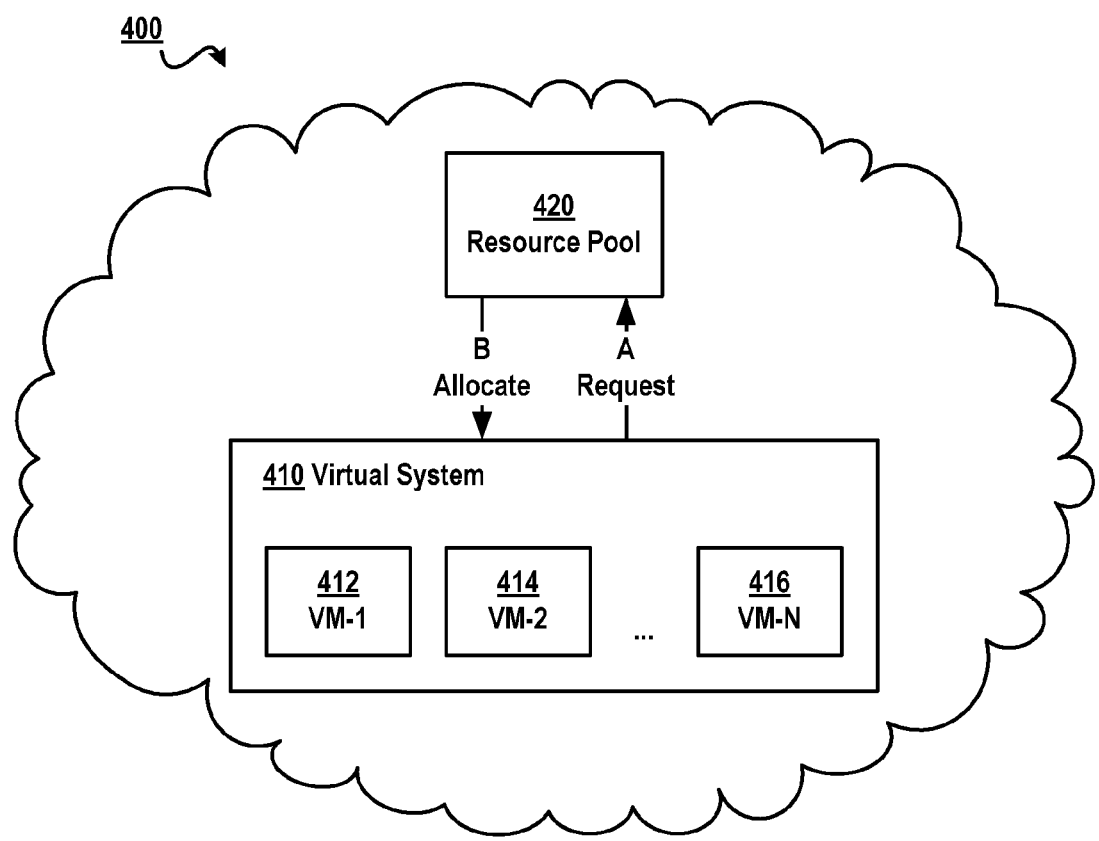
FIG. 4 schematically illustrates a flowchart of a resource allocation method according to one technical solution.

FIG. 4 schematically illustrates a block diagram of a resource allocation method according to one technical solution. In this technical solution, a virtual system 410 consists of a plurality of virtual machines, which are denoted as a VM-1 412, a VM-2 414, . . . , and a VM-N 416 respectively. Suppose in virtual system 410 there are running a plurality of applications, which can be deployed on VM-1 412 to VM-N 416 respectively. Specifically, the applications may comprise: an application 1 running on VM-1 412 and configured to handle user access to a shopping website; an application 2 running on VM-2 414 and configured to handle storage of goods-related data, etc.

In this technical solution, when application 1 becomes overloaded as failing to handle excessive user access, additional computing resources from a resource pool 420 of the cloud computing system may be requested (as shown by arrow A). Although the technical solution as shown in FIG. 4 enables virtual system 410 to obtain required computing resources so as to handle ever increasing user access, when there is no additional computing resource in resource pool 420, this technical solution cannot ensure virtual system 420 to run normally. In addition, the following situation may exist: although virtual machine VM-1 412 becomes overloaded due to excessive user visits, virtual machine VM-2 414 still contains abundant free computing resources. By virtue of the technical solution shown in FIG. 4, application 1 cannot invoke free computing resources on virtual machine VM-2 414. That is, once the configuration of each virtual machine is determined, resource reallocation is unavailable among various virtual machines in virtual system 410.

Figure 5:
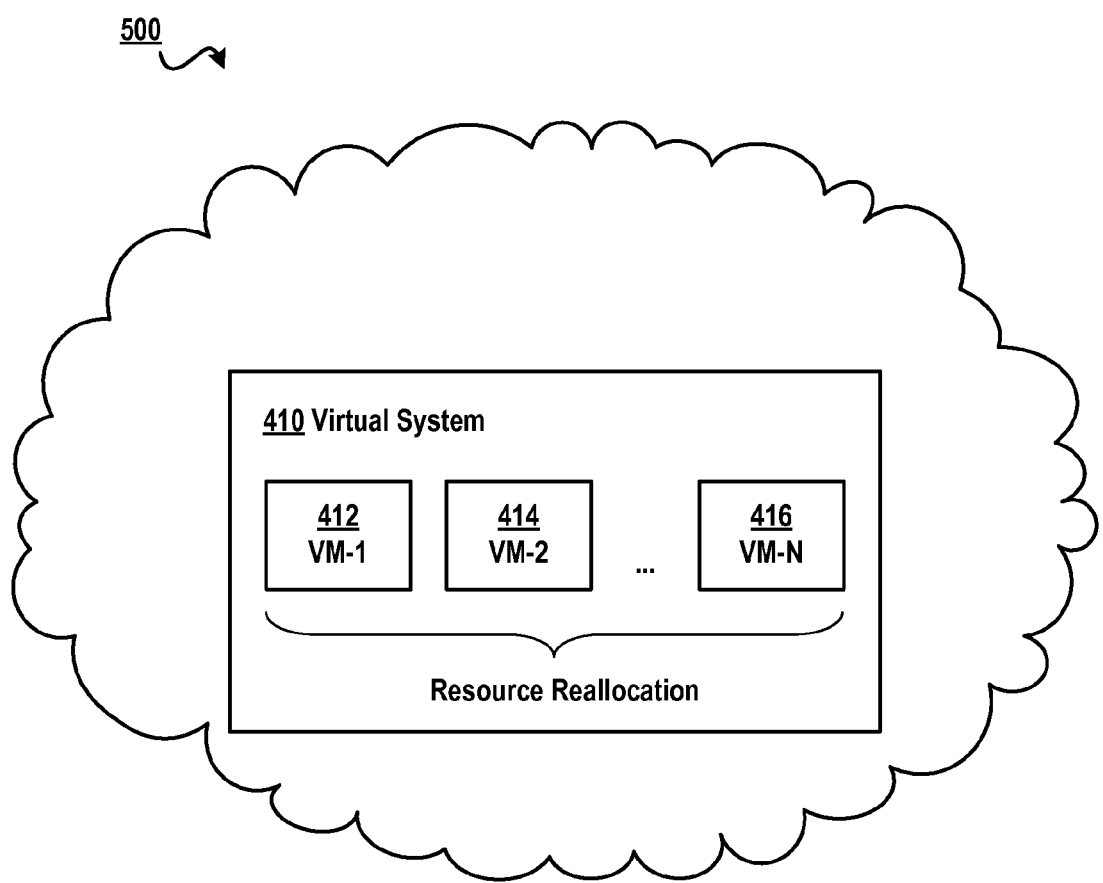
FIG. 5 schematically illustrates an architecture diagram of a technical solution for resource allocation in a cloud environment according to one embodiment of the present invention.

In view of the drawbacks in the technical solution as shown in FIG. 4, it is desired to develop a method and apparatus capable of adaptively allocating resources among a plurality of virtual machines in a virtual system in a cloud computing environment. Specifically, FIG. 5 schematically illustrates an architecture diagram of a technical solution for resource allocation in a cloud environment according to one embodiment of the present invention. Unlike requesting additional computing resources to the resource pool as shown in FIG. 4, in the embodiment shown in FIG. 5 resource reallocation is implemented among virtual machines VM-1 412, VM-2 414, . . . , VM-N 416, so as to ensure the normal operation of virtual system 410.

Specifically, in one embodiment of the present invention there is provided: detecting a metrics parameter of at least a first virtual machine among a plurality of virtual machines inside a virtual system in the cloud environment; calculating a key performance indicator according to the metrics parameter, the key performance indicator indicating running status of at least the first virtual machine; and reallocating resources among at least the first virtual machine and other virtual machines within the virtual system based on the key performance indicator through the cloud environment in response to the key performance indicator indicating that at least the first virtual machine is overloaded.

Figure 6:
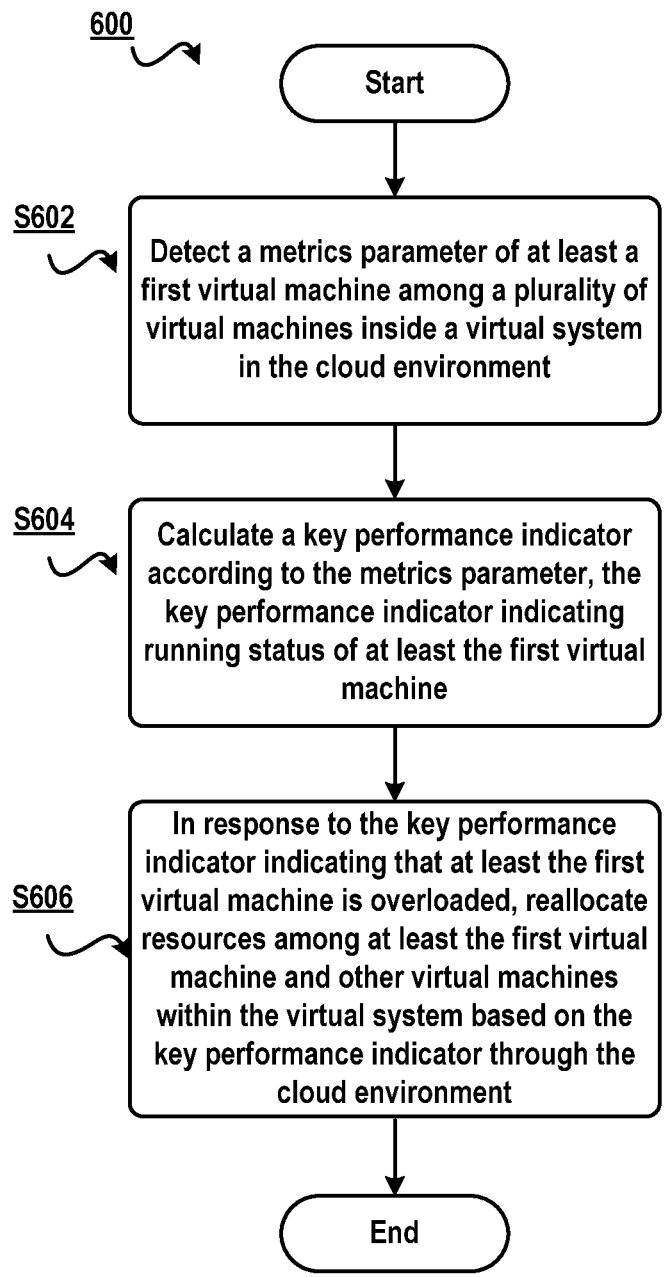
FIG. 6 schematically illustrates a flowchart of a method for resource allocation in a cloud environment according to one embodiment of the present invention.

Specifically, FIG. 6 schematically illustrates a flowchart 600 of a method for resource allocation in a cloud environment according to one embodiment of the present invention. In step S602, a metrics parameter of at least a first virtual machine among a plurality of virtual machines in the cloud environment is detected. In this embodiment, the metrics parameter refers to a parameter capable of measuring running status of the virtual machine. Metrics parameters from one or more virtual machines in the virtual system may be collected. For example, a metrics parameter of each virtual machine may be monitored in real time, or a metrics parameter of a virtual machine whose running status fluctuates wildly may further be monitored.

In step S604, a key performance indicator is calculated according to the metrics parameter, the key performance indicator indicating running status of at least the first virtual machine. In this embodiment, the metrics parameter may comprise multiple parameters used for evaluating various aspects of the virtual machine. For example, the key performance indicator may be calculated by weighting multiple parameters.

In step S606, in response to the key performance indicator indicating that at least the first virtual machine is overloaded, resources are reallocated among at least the first virtual machine and other virtual machines within the virtual system based on the key performance indicator through the cloud environment. Since the key performance indicator can indicate running status of at least the first virtual machine, judgment as to whether the first virtual machine is overloaded or not can be made based on the key performance indicator; subsequently, a virtual machine with adequate computing resources is selected from other virtual machines within the virtual system, and resource reallocation is conducted between the first virtual machine and the other virtual machine.

The various virtual machines in the embodiments of the present invention are not ordinary virtual machines in a conventional computing environment but are uniformly scheduled by a control center of the cloud environment. Therefore, when the key performance indicator indicates at least the first virtual machine is overloaded, the cloud environment adjusts resource allocation among the various virtual machines inside the virtual system, rather than allocating additional resources to the first virtual machine in the prior art. Note by means of the technical solution as recited in the embodiment of the present invention, besides providing resource allocation among virtual machines at the level of the control center of the cloud environment, resource scheduling within virtual systems can be achieved at the level of virtual systems in the cloud environment.

Note the virtual system as recited in the context of the present invention differs from a conventional cluster. In a cluster environment various nodes are homogeneous, usually nodes have the same physical configuration and logical configuration. Due to the complexity of cloud environment, computing devices that provide computing resources in the cloud environment are physically diverse, for example, some computing resources might come from a personal computer, while others come from a server device. On the other hand, the software configuration on various computing devices is also varying. For example, for a virtual system of the above-described online ticket booking website, various types of computing devices may be involved, and various types of applications may run on each computing device, such as an application for accessing airline databases, an application for managing online payment, etc. Due to the complexity of cloud environment, resource scheduling methods with respect to clusters in the prior art are not applicable to allocate resources in the cloud environment.

In one embodiment of the present invention, a key performance indicator of each virtual machine in the virtual system is calculated, and other virtual machine with adequate computing resources is selected according to the indicator.

In one embodiment of the present invention, the total amount of resources occupied by the virtual system remains the same throughout the reallocation. According to the principle of the present invention, resource reallocation among a plurality of virtual machines inside the virtual system takes precedence, and when the resource reallocation cannot satisfy requirements for running the virtual system, additional computing resources are requested to the cloud computing environment. Therefore, the total amount of resources occupied by the virtual system remains the same throughout the resource reallocation of the present invention.

Those skilled in the art may design by themselves how to implement resource reallocation, for example, migrating an application causing an overload of the first virtual machine to other virtual machine with more adequate computing resources, or allocating free computing resources in other virtual machine with more adequate computing resources to the first virtual machine for alleviating the overload in the first virtual machine.

In one embodiment of the present invention, the metrics parameter comprises any of: an application metrics parameter indicating a performance parameter of an application running on at least the first virtual machine among the plurality of virtual machines; and a hardware metrics parameter indicating a performance parameter of hardware in at least the first virtual machine among the plurality of virtual machines.

In the embodiments of the present invention, performance status of a virtual machine may be measured from several aspects. On one hand, performance status of a specific virtual machine may be measured based on performance of an application running on the specific virtual machine. For example, in the above example shown in FIG. 4, application 1 running on VM-1 412 is configured to handle user access to a shopping website, at which point response time of application 1 with respect to user access may be used as a metrics parameter. When the response time is short (e.g. less than 10 milliseconds), it may be considered that running status of VM-1 412 is good; when the response time slows down (e.g. more than 3 seconds), it may be considered that running status of VM-1 412 has deteriorated, and resource reallocation is required.

On the other hand, performance status of a specific virtual machine may be measured based on various hardware indicators of the specific virtual machine. For example, these hardware indicators may comprise without limitation: CPU usage, memory usage, CPU temperature, I/O response time, etc. In one embodiment of the present invention, the application metrics parameter and the hardware metrics parameter may be used separately or in combination with each other.

Those skilled in the art may design a concrete calculation mode of the metrics parameter according to the principle described above. For example, the hardware metrics parameter may comprise: CPU usage, denoted by a decimal between 0 and 1 (e.g. 0.9); memory usage, denoted by a decimal between 0 and 1 (e.g. 0.5), etc. Where the metrics parameter is measured by hardware indicators, CPU usage and memory usage may be weighted before summation, so as to calculate the key performance indicator. In one embodiment of the present invention, the key performance indicator may be calculated using a formula below:

$$KPI = \Sigma_{i=1}^{m} \alpha_i \cdot par_i \qquad \text{Formula 1}$$

Where m represents the number of metrics parameters; where there are comprised CPU usage and memory usage, m=2. $\alpha_i$ represents a weight with respect to the $i^{th}$ metrics parameter. $par_i$ represents a value of the $i^{th}$ metrics parameter. In the above example, when weights used for CPU usage and memory usage are set as 0.5, KPI=0.5×0.9+0.5×0.5=0.70. Those skilled in the art may further use other formula to calculate a key performance indicator of each virtual machine. Although a calculation mode for the key performance indicator has been shown above by taking hardware metrics parameters as an example, those skilled in the art may design, based on the principle being illustrated, concrete algorithms for calculating the key performance indicator based on the application metrics parameter and/or hardware metrics parameter.

In one embodiment of the present invention, the reallocating resources among at least the first virtual machine and other virtual machines within the virtual system based on the key performance indicator through the cloud environment in response to the key performance indicator indicating that at least the first virtual machine is overloaded comprises: selecting a second virtual machine with adequate free resources from the other virtual machines based on the key performance indicator; and reallocating resources between at least the first virtual machine and the second virtual machine.

In one embodiment of the present invention, running status of the virtual machine may be evaluated using the key performance indicator. For example, it may be defined that a workload of the virtual machine may be denoted using a decimal between 0 and 1. The greater the value is, the more serious the overload of the virtual machine is; the less the value is, the less the workload of the virtual machine is. Therefore, whether the first virtual machine is overloaded or not may be judged based on the key performance indicator of each virtual machine; then, the second virtual machine with adequate free resources is selected, so as to reallocate resources between the first virtual machine and the second virtual machine.

For example, it may be defined when the key performance indicator is greater than or equal to 0.6, it is considered the virtual machine is overloaded. In the above example, the key performance indicator=0.7≥0.6, so a virtual machine with a lower key performance indicator is selected as the second virtual machine from other virtual machines in the virtual system.

In one embodiment of the present invention, the reallocating resources between at least the first virtual machine and the second virtual machine comprises: searching for an application causing an overload of the first virtual machine; and migrating the application from at least the first virtual machine to the second virtual machine.

The application causing the overload of the virtual machine may be searched based on system logs of this virtual machine or the application metrics parameter, etc. For example, when application 1 (for handling user access to a shopping website) and application 2 (for handling storage of goods-related data) are running on VM-1 412 as shown in FIG. 4, the amount of computing resources occupied by each application may be detected, and then an application that influences the workload of the virtual machine most significantly is found. For example, when user visits soar, it may be found that application 1 is the application causing the overload of the virtual machine. Subsequently, the application 1 is migrated from at least the first virtual machine to the second virtual machine. Hereinafter, detailed description is presented to how to migrate the application.

Figure 7:
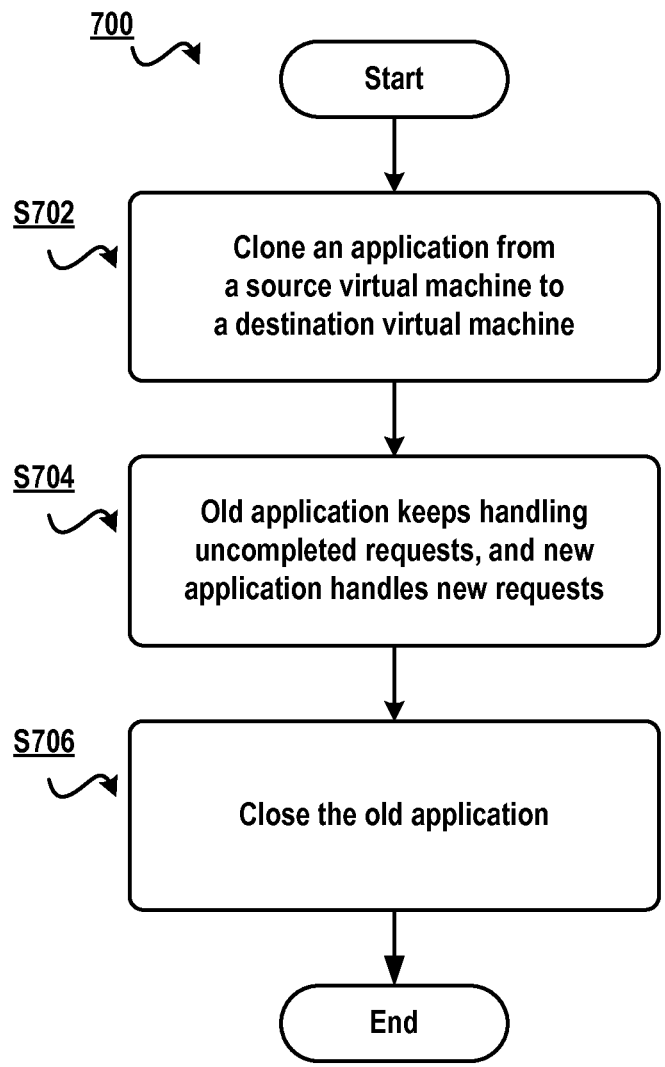
FIG. 7 schematically illustrates a flowchart of a method for migrating an application according to one embodiment of the present invention.

FIG. 7 schematically illustrates a flowchart 700 of a method for migrating an application according to one embodiment of the present invention. In step S702, a to-be-migrated application is cloned from a source virtual machine to a destination virtual machine, here "to clone" means copying all data associated with to-be-cloned application from the source virtual machine to the destination virtual machine. During the clone operation, the application on the source virtual machine keeps running (for instance, in the above example of application 1, application 1 keeps handling received requests for accessing the shopping website).

In this embodiment, a time point when the clone operation is completed may be used as an indicator, for determining which virtual machine responds to a user access request. Specifically, in step S704, before that time point the source virtual machine handles requests which have been received but not yet completed, and after that time point the destination virtual machine receives new requests. The principle of the migration operation has been illustrated above, and those skilled in the art may use other approach to determining which virtual machine responds to a user access request during the migration operation. In step S706, an application in the source virtual machine is closed, at which point the application has been migrated to the destination virtual machine and the destination virtual machine receives and handles user requests.

Figure 8A:
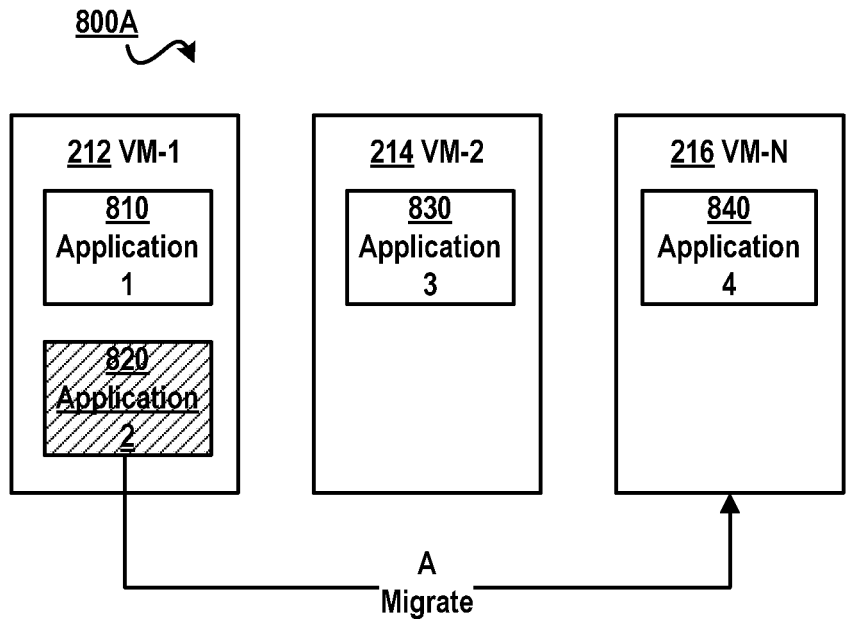
FIGS. 8A and 8B schematically illustrate block diagrams of migrating an application according to one embodiment of the present invention, respectively.
Figure 8B:
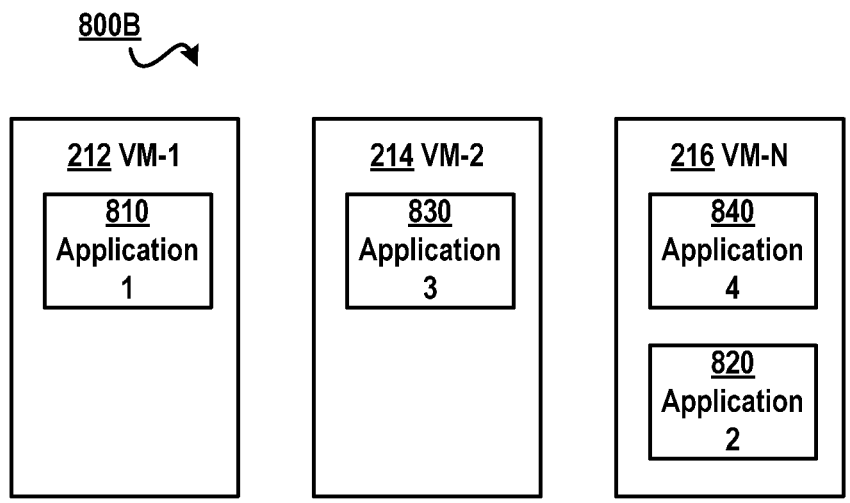

FIGS. 8A and 8B schematically illustrate block diagrams 800A and 800B of migrating an application according to one embodiment of the present invention, respectively. In FIG. 8A, suppose an application 1 810 and an application 2 820 are running on a virtual machine VM-1 212, an application 3 830 is running on a virtual machine VM-2 214, and an application 4 840 is running on a virtual machine VM-N 216. It has been determined using the above method that application 2 820 (shown in shadow) is the application causing the overload of virtual machine VM-1 212, and it is desired to migrate application 2 820 to virtual machine VM-N 216 with adequate free resources.

The method described with reference to FIG. 7 may be used for migrating application 2 820 causing the overload of virtual machine VM-1 212 to virtual machine VM-N 216. Since virtual machine VM-N 216 has adequate free resources, after the migration operation each of application 1 to application 4 is in normal running status.

Another circumstance might exist. For example, application 2 820 needs to occupy huge amount of computing resources, while currently none of the other virtual machines in the virtual system have adequate computing resources to run application 2 820. Note although no virtual machine with adequate computing resources can be found at this point, the distribution of a plurality of applications among respective virtual machines may be adjusted by migrating an application within the virtual system, and then adequate computing resources to run application 2 820 are obtained at a single virtual machine.

Figure 9A:
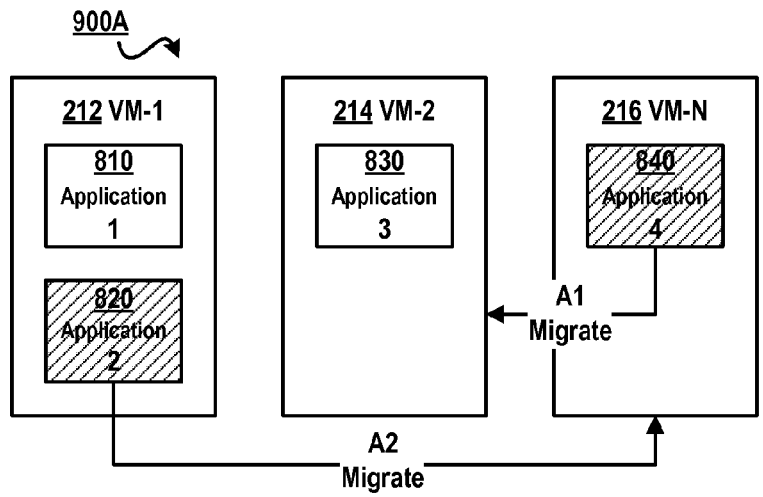
FIGS. 9A, 9B and 9C schematically illustrate block diagrams of migrating an application according to another embodiment of the present invention.
Figure 9B:
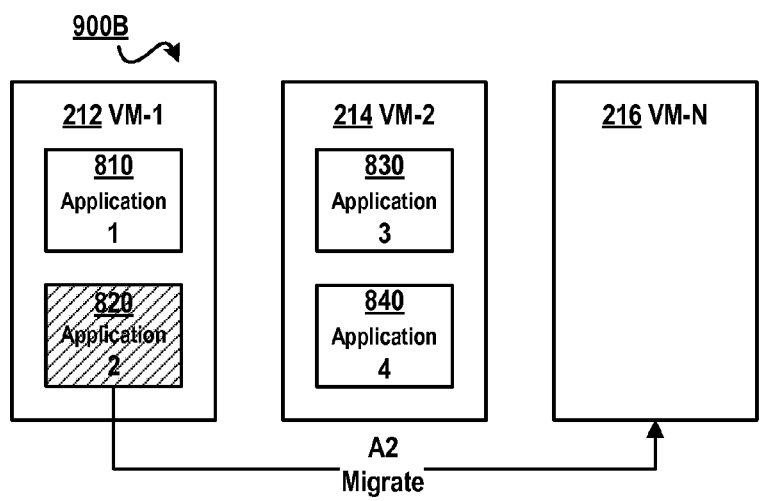
Figure 9C:
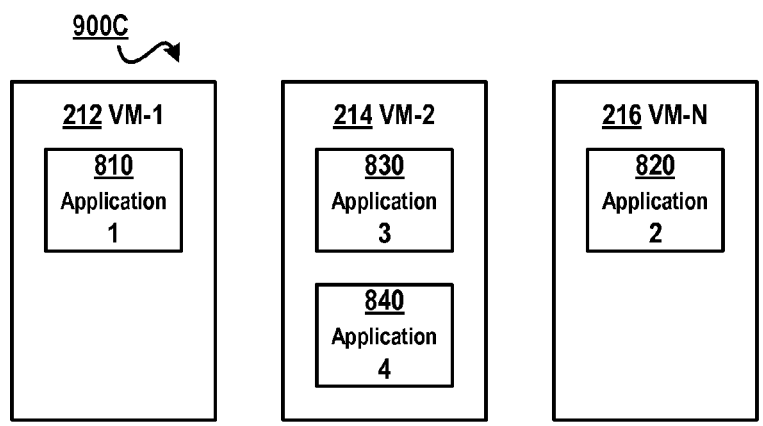

FIGS. 9A, 9B and 9C schematically illustrate block diagrams 900A, 900B and 900C of migrating an application according to one embodiment of the present invention, respectively. As shown in FIG. 9A, application 4 840 is running on virtual machine VM-N 216, and currently free resources of virtual machine VM-N 216 are not adequate to run application 2 820. At this point, first application 4 840 is migrated to virtual machine VM-2 214 (as shown by arrow A1), and subsequently application 2 820 is migrated to virtual machine VM-N 216 (as shown by arrow A2).

As shown in FIG. 9B, application 4 840 has been migrated to virtual machine VM-2 214, so virtual machine VM-N 216 has adequate resources to run application 2 820. Next, application 2 820 is migrated to virtual machine VM-N 216 through the migration step as shown by arrow A2. FIG. 9C shows the state after migration, at which point application 3 830 and application 4 840 are running on virtual machine VM-2 214, and application 1 810 and application 2 820 are running on virtual machine VM-1 212 and virtual machine VM-N 216, respectively, and each application is in normal running status.

Compared with the technical solution for requesting computing resources to the resource pool in the cloud computing environment in the prior art, the migration process as shown in FIGS. 9A to 9C can provide more flexibility and increase resource usage in each virtual machine.

In one embodiment of the present invention, the reallocating resources between at least the first virtual machine and the second virtual machine comprises: allocating free resources of the second virtual machine to at least the first virtual machine. Since the various embodiments of the present invention relate to resource allocation among plurality of virtual machines in a virtual system, in addition to migrating an application causing the overload of the source virtual machine to the destination virtual machine with adequate computing resources, free resources in other virtual machine may further be allocated to the source virtual machine so as to alleviate resource shortage in the source virtual machine.

In one embodiment of the present invention, there is further comprised: after the reallocation, requesting additional resources to the cloud environment in response to there still existing resource shortage. If resource reallocation within the virtual system still cannot satisfy demands, then additional resources may be requested to the resource pool in the cloud computing environment. The request operation in this step may conform to the resource requesting process in the cloud computing environment and thus is not detailed.

In one embodiment of the present invention, the metrics parameter is detected by means of at least one of: periodically; and in response to an alert in the virtual system. To predict possible overload in the virtual system, the metrics parameter of each virtual machine may be monitored periodically; or where the virtual system has an overload alert, the method as recited by the present invention is executed. By combining the above two triggering approaches, on one hand running status of each virtual machine may be monitored substantially in real time (e.g. every minute); on the other hand, when there is an alert, potential danger can be handled in time, so as to avoid the occurrence of more serious faults such as system crashes.

Figure 10:
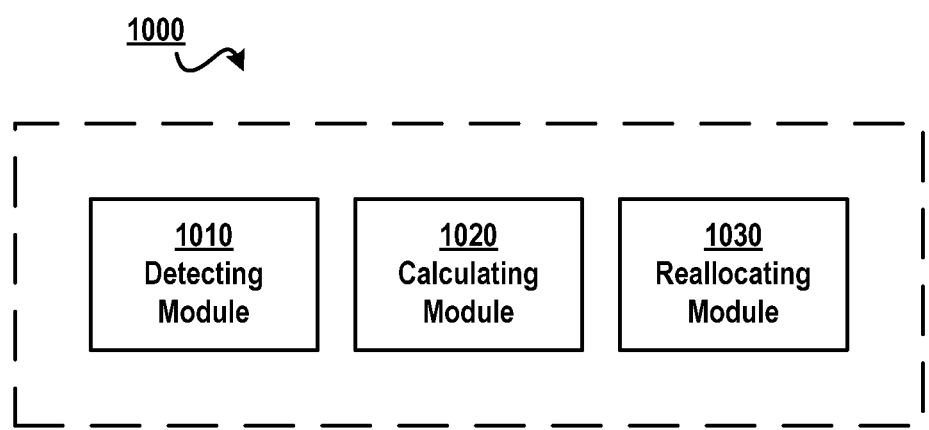
FIG. 10 schematically illustrates a block diagram of an apparatus for resource allocation in a cloud environment according to one embodiment of the present invention.

FIG. 10 schematically illustrates a block diagram 1000 of an apparatus for resource allocation in a cloud environment according to one embodiment of the present invention. In one embodiment of the present invention there is provided an apparatus for resource allocation in a cloud environment: a measuring module 1010 configured to detect a metrics parameter of at least a first virtual machine among plurality of virtual machines inside a virtual system in the cloud environment; a calculating module 1020 configured to calculate a key performance indicator according to the metrics parameter, the key performance indicator indicating running status of at least the first virtual machine; and a reallocating module 1030 configured to, in response to the key performance indicator indicating that at least the first virtual machine is overloaded, reallocate resources among at least the first virtual machine and other virtual machines within the virtual system based on the key performance indicator through the cloud environment.

In one embodiment of the present invention, the total amount of resources occupied by the virtual system remains the same.

In one embodiment of the present invention, the metrics parameter comprises any of: an application metrics parameter indicating a performance parameter of an application running on at least the first virtual machine among the plurality of virtual machines; and a hardware metrics parameter indicating a performance parameter of hardware in at least the first virtual machine among the plurality of virtual machines.

In one embodiment of the present invention, the reallocating module comprises: a selecting module configured to select a second virtual machine with adequate free resources from the other virtual machines based on the key performance indicator; and a resource reallocating module configured to reallocate resources between at least the first virtual machine and the second virtual machine.

In one embodiment of the present invention, the resource reallocating module comprises: a searching module configured to search for an application causing an overload of the first virtual machine; and a migrating module configured to migrate the application from at least the first virtual machine to the second virtual machine.

In one embodiment of the present invention, the resource reallocating module comprises: a resource allocating module configured to allocate free resources of the second virtual machine to at least the first virtual machine.

In one embodiment of the present invention, there is further comprised: a requesting module configured to, after the reallocation, request additional resources to the cloud environment in response to there still existing resource shortage.

In one embodiment of the present invention, the metrics parameter is detected by means of at least one of: periodically; and in response to an alert in the virtual system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for resource allocation in a cloud environment, comprising:
  detecting a plurality of metrics parameters of at least a first virtual machine among a plurality of virtual machines inside a virtual system in the cloud environment, wherein the plurality of metrics parameters include at least an application metrics parameter indicating a performance parameter of an application running on at least the first virtual machine among the plurality of virtual machines and a hardware metrics parameter indicating a performance parameter of hardware in at least the first virtual machine among the plurality of virtual machines, wherein each of the plurality of metrics parameters is detected both periodically to predict a possible overload of the first virtual machine and in response to an alert in the virtual system to indicate a current overload of the first virtual machine, wherein the hardware metrics parameter includes at least one of CPU usage, memory usage, and CPU temperature;
  calculating, using a processor and a memory, a key performance indicator according to the plurality of metrics parameters, the key performance indicator indicating an overloaded running status of at least the first virtual machine, wherein the key performance indicator is calculated as a weighted summation of the application metrics parameter and the hardware metrics parameter;
  determining an amount of computing resources needed to reduce the overloaded running status of the first virtual machine, wherein the resources comprise computing resources other than electrical power, and wherein the computing resources are internal computing resources within the virtual system;
  evaluating that no single virtual machine in the virtual system has the amount of computing resources free for reallocating to the first virtual machine;
  migrating a workload from a second virtual machine in the virtual system to a third virtual machine in the virtual system, thereby making the amount of computing resources free in the second virtual machine for reallocating to the first virtual machine;
  reallocating the amount of computing resources from the second virtual machine to the first virtual machine within the virtual system;
  reallocating resources between the first virtual machine and the second virtual machine based on the key performance indicator, in response to the key performance indicator indicating that at least the first virtual machine is overloaded, wherein a total amount of resources occupied by the virtual system remains the same throughout the reallocation, wherein the reallocating resources between the first virtual machine and the second virtual machine includes:
    searching for an application causing an overload of the first virtual machine using the application metrics parameter; and
    migrating the application from at least the first virtual machine to the second virtual machine, wherein migrating the application from at least the first virtual machine to the second virtual machine includes cloning the application and data associated with the application to the second virtual machine, wherein the at least the first virtual machine is configured to handle requests received by the application during the cloning of the application and the data associated with the application, wherein a time indicator determines whether the first virtual machine or the second virtual machine handles requests received by the application; and
  requesting additional resources, after reallocating resources between the first virtual machine and the second virtual machine, to the cloud environment in response to there still existing resource shortage.

2. An apparatus for resource allocation in a cloud environment, comprising:
  a storage device, wherein the storage device stores computer usable program code; and
  a processor, wherein the processor executes the computer usable program code, and wherein the computer usable program code comprises:
  a measuring module configured to detect a plurality of metrics parameters of at least a first virtual machine among a plurality of virtual machines inside a virtual system in the cloud environment, wherein the plurality of metrics parameters include at least an application metrics parameter indicating a performance parameter of an application running on at least the first virtual machine among the plurality of virtual machines and a hardware metrics parameter indicating a performance parameter of hardware in at least the first virtual machine among the plurality of virtual machines, wherein each of the plurality of metrics parameters is detected both periodically to predict a possible overload of the first virtual machine and in response to an alert in the virtual system to indicate a current overload of the first virtual machine, wherein the hardware metrics parameter includes at least one of CPU usage, memory usage, and CPU temperature;
  a calculating module configured to calculate a key performance indicator according to the plurality of metrics parameters, the key performance indicator indicating an overloaded running status of at least the first virtual machine, wherein the key performance indicator is calculated as a weighted summation of the application metrics parameter and the hardware metrics parameter;
  a determining module configured to determine an amount of computing resources needed to reduce the overloaded running status of the first virtual machine, wherein the resources comprise computing resources other than electrical power, and wherein the computing resources are internal computing resources within the virtual system;
  an evaluating module configured to evaluate that no single virtual machine in the virtual system has the amount of computing resources free for reallocating to the first virtual machine;
  a migrating module configured to migrate a workload from a second virtual machine in the virtual system to a third virtual machine in the virtual system, thereby making the amount of computing resources free in the second virtual machine for reallocating to the first virtual machine;

a reallocating module configured to reallocate the amount of computing resources from the second virtual machine to the first virtual machine within the virtual system;

wherein the reallocating module is further configured to reallocate resources between the first virtual machine and the second virtual machine based on the key performance indicator, in response to the key performance indicator indicating that at least the first virtual machine is overloaded, wherein a total amount of resources occupied by the virtual system remains the same throughout the reallocation, wherein the reallocating resources between the first virtual machine and the second virtual machine includes:

a searching module configured to search for an application causing an overload of the first virtual machine using the application metrics parameter; and a migrating module configured to migrate the application from at least the first virtual machine to the second virtual machine, wherein migrating the application from at least the first virtual machine to the second virtual machine includes cloning the application and data associated with the application to the second virtual machine, wherein the at least the first virtual machine is configured to handle requests received by the application during the cloning of the application and the data associated with the application, wherein a time indicator determines whether the first virtual machine or the second virtual machine handles requests received by the application; and a requesting module configured to, after the reallocation, request additional resources, after reallocating resources between the first virtual machine and the second virtual machine, to the cloud environment in response to there still existing resource shortage.

* * * * *